Patented Nov. 16, 1937

2,098,998

UNITED STATES PATENT OFFICE 2,098,998

RATION

William Henry Brinton, near Coatesville, Pa.

No Drawing. Application November 3, 1933, Serial No. 696,537

3 Claims. (Cl. 99—1)

My invention relates to a mineral and medicinal supplement to a food ration, particularly desirable for use in a stock feeding ration but intended for any food ration to which it may be suited, whether to be taken by animals or by man.

In my copending application Serial No. 62,169, filed February 3, 1936 in continuation of my application Serial No. 655,082, filed February 3, 1933, claims are directed to the iodized feeding oil.

A purpose of the invention is to introduce iodine into the digestive system of an animal, fowl or man in a combination that is readily acted on by the digestive processes and absorbed into the body fats by combining the iodine with a plurality of recognized and necessary ingredients of the ration.

A further purpose is to combine iodine and a plurality of other recognized ingredients of a ration in a form that will mix readily with water or milk and that will remain for a suitable period in reasonably perfect suspension. In those areas deficient in calcium, lime water may be added to diffuse the iodized oil and dispersion agent.

A further purpose is to step up the iodine content of an oil of a ration for example, to the desired iodine content of the ration, then to properly distribute the iodine throughout the ration by the mixing of the oil with meal or one or more other ingredients of the ration.

A further purpose is to use an oil ingredient of a feed meal or ration as a carrier for the distribution of iodine throughout the meal or ration.

I add the iodine, suitably as solid crystals, to the iodine reactive oil without the presence of the remaining or other ingredient of the meal or ration, preferably thereafter thoroughly mixing the mass, as in a ration mixer, in order to obtain uniformity of distribution of the iodine.

On combining the iodine and feeding oil it is usually advisable to add some water. Heat very noticeably speeds the reaction. However the temperature must not exceed 140° F. because of danger of destroying the vitamins.

A further purpose is to permit the effective use of ground lime stone rather than the much more expensive ground oyster shells in the ration of poultry by incorporating the ground lime stone with an iodized meal or other iodized food element of the ration.

A further purpose is to incorporate iodized feeding oils, or/and iodized feeding meals in the salt or/and salt cakes for range cattle.

A further purpose is to partially iodize an oil, suitably a vitamin-bearing fish oil, as cod-liver oil, or an animal or vegetable fat, and to mix the partially iodized oil with a finely divided absorbent material preferably a feeding meal, as with dried milk, malted milk, malted sugars (Ovaltine), bone meal or other food meal or gum arabic.

To further add to the palatability of the iodized food oil in suspension, I find the addition of lemon juice and suitable proportions of table salt to be effective. I also find that the addition of such appetizers as chili sauce and proper proportions of table salt tend to minimize the fishy taste of the oil.

Further purposes will appear in the specification and in the claims.

As a dispersion-producing material I prefer a vitamin-bearing food meal, as dried milk, malted milk or similar food materials, bone meal or protein feeding meal, such as meat meal, fish meal, tankage, or (as an example of vegetable protein) cottonseed meal, linseed meal, corn gluten, peanut meal or soy-bean meal. Gum arabic is also effective.

The dried milk, gum arabic, or meal is a dispersion producing material, obtaining a substantially homogeneous mix of volume very large as compared to its iodine content, and I may use this mix when making up the food ration, permissibly with merely rough approximation in the quantity of mix taken when making up the ration, without danger of any very serious changes in the iodine content of the ration.

It is quite desirable that the initial volume with which the iodine is mixed shall be relatively large and that the mixing shall be quite effectively carried out, in order to reduce the danger of pockets or concentrated spots of iodine which may then continue into the final mix as relatively concentrated iodine-containing mix.

In a poultry ration I usually prefer to use cod-liver oil as a recipient or carrier of the iodine but may use other fish food oils, such as menhaden oil, herring oil, blubber oil, sperm oil, high seal oil, sardine oil, cod oil, caal fish oil, shark-liver oil, pilchard oil, halibut-liver oil, burbot oil, or salmon oil, salmon oil being particularly desirable because of its high vitamin A and D content and its palatable character. Burbot oil is particularly advantageous for the carrying of iodine, as its content of vitamins A and D is about ten times that of cod liver oil, for example, but it is normally very low in iodine, since the burbot is a Great Lakes fish.

I find also where a meal is adequately oily with an iodine reactive oil, good results may be obtained by adding the powdered iodine directly to the oily meal, as to bone meal and to fish meal, with thorough mixing after the addition of the iodine in order to secure adequately uniform distribution of the iodine throughout the meal.

Fish meal and bone meal fortified with iodine make a particularly valuable protein and mineral supplement respectively for poultry and live stock.

The assimilation of mineral salts by poultry, live stock or man is much assisted by the presence of iodine, which is necessary for example for the metabolism of calcium, so that an addition of calcium to a ration is relatively ineffective unless there is also added sufficient iodine to make metabolism of the calcium effective.

Hitherto it has been usual to supply the calcium to poultry in the form of ground oyster shell, the much cheaper ground lime stone being much less desirable, in that the oyster shells have been far higher in their iodine content than the lime stone.

By mixing the ground lime stone with the iodized food oil I make the ground lime stone which is nearly always much more available and cheaper than oyster shells equally or more effective as a source of calcium than the oyster shell, thereby eliminating the need for oyster shell in the poultry ration.

The feeding of iodized food oil with milk and ground lime stone is particularly desirable in the case of poultry. Chickens require a high iodine content in normal living and a high proportion of iodine in their ration.

Iodine aids the assimilation of minerals necessary for egg laying and vitamin D acts similarly.

The combination of iodine, feeding oil and feeding bone meal is particularly desirable. More usually I add the iodine as powdered crystals to the feeding oil and to an amount insufficient to saturate the unsaturated glycerides and after the completion of the reaction add the feeding bone meal, intimately mixing the meal and iodized oil.

Where the feeding bone meal contains sufficient fat, the iodine may be combined directly with the meal, the iodine being added finely divided throughout the meal and the mass well mixed. The heating of the meal actively promotes the reaction. In each case salt and lime may be added to make up a complete mineral supplement.

In order to facilitate the action of iodine in the feeding oils or other material to be iodized, the iodine may be heated to vaporizing temperature and passed directly into the heated oil to be iodized. The action is rapid and particularly effective.

The simplest way to iodize my feeding oil is to bring iodine crystals directly into contact with the feeding oil, and allow unsaturated glycerides of the feeding oil to react with the iodine. Where the bone meal or other meal contains an oil which is to be iodized, the same procedure may be adopted, in which case the unsaturated glycerides of the oil in the bone meal or other meal will react directly with the iodine.

The iodization of the bone meal is particularly desirable because iodine assists in the assimilation of calcium, and calcium is present in substantial quantities in bone meal. Unless precautions are taken to insure the presence of iodine in the ration, the feeding of calcium is likely to be of little avail, because much of the calcium will pass through the body of the animal without assimilation due to lack of iodine to assist in calcification. Where iodine is present in the ration, it is even possible to obtain proper assimilation of calcium from powdered limestone, notwithstanding that iodine is entirely or almost entirely absent from the limestone.

Vitamin D has an action in assisting calcification similar to that of iodine. It was at one time considered that vitamin D controlled calcification, but this opinion is being abandoned for the view that vitamin D assists calcification. My results indicate that vitamin D and iodine form a particularly happy combination which is very conducive to rapid and highly efficient calcification.

The presence of fatty acids in the ration containing the iodine is highly desirable as they take up the iodine and aid the absorption of iodine. The fatty acids are said to "protect" the iodine, in that they assist assimilation of the iodine and prevent immediate elimination of the iodine from the animal body. This may be due to the fact that the iodine combines with the unsaturated bonds in any unsaturated glycerides during digestion, if it is not so combined previously, and is absorbed with the glycerides and distributed to the parts of the body to which the glycerides go.

Having thus described my invention, what I claim as new and desire to secure by Letters Patent is:

1. A food ration including feeding oil and feeding bone meal with artificial iodization of the meal.

2. A food ration including an artificially iodized bone meal.

3. A food ration including the reaction product of solid iodine and a feeding bone meal.

WILLIAM HENRY BRINTON.